3 Sheets—Sheet 1.

W. H. LEACH & A. S. ALLEN.
Cloth-Finishing Machine.

No. 198,463. Patented Dec. 25, 1877.

Witnesses
S. N. Piper
L. W. Möller

Inventor
William H. Leach,
Arnold S. Allen,
by their attorney
R. H. Eddy

3 Sheets—Sheet 2.

W. H. LEACH & A. S. ALLEN.
Cloth-Finishing Machine.

No. 198,463.      Patented Dec. 25, 1877.

Witnesses.
S. N. Piper
L. W. Miller

Inventor
William H. Leach
Arnold S. Allen
by their attorney
R. H. Eddy

3 Sheets—Sheet 3.

W. H. LEACH & A. S. ALLEN.
Cloth-Finishing Machine.

No. 198,463. Patented Dec. 25, 1877.

Witnesses
S. N. Piper
L. H. Miller

Inventor
William H. Leach
Arnold S. Allen
by their attorney
R. H. Eddy

UNITED STATES PATENT OFFICE.

WILLIAM H. LEACH AND ARNOLD S. ALLEN, OF UXBRIDGE, MASS.

IMPROVEMENT IN CLOTH-FINISHING MACHINES.

Specification forming part of Letters Patent No. 198,463, dated December 25, 1877; application filed July 10, 1877.

*To all whom it may concern:*

Be it known that we, WILLIAM H. LEACH and ARNOLD S. ALLEN, of Uxbridge, of the county of Worcester and State of Massachusetts, have made a new and useful invention having reference to the Finishing of Cloth; and do hereby declare the same to be described in the following specification and represented in the accompanying drawings, of which—

Figure 1:
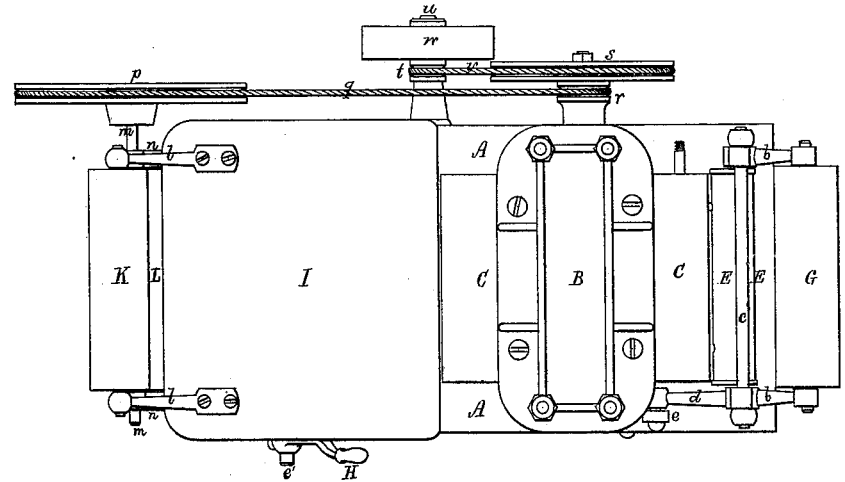
Figure 2:
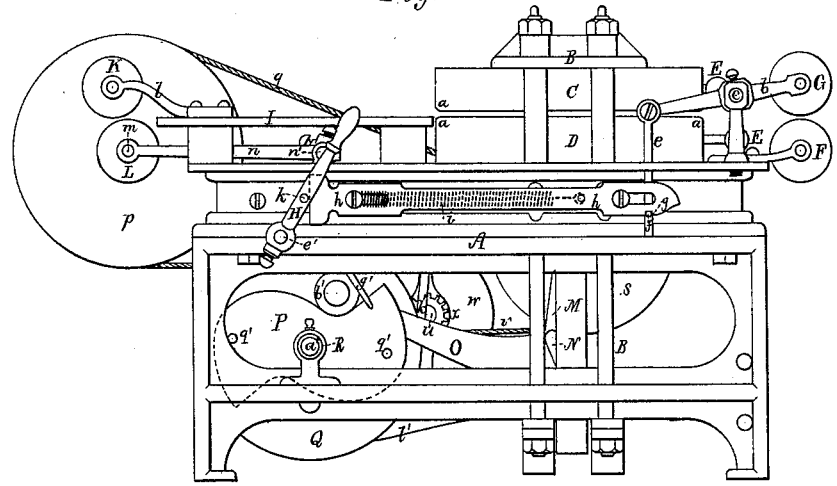
Figure 4:
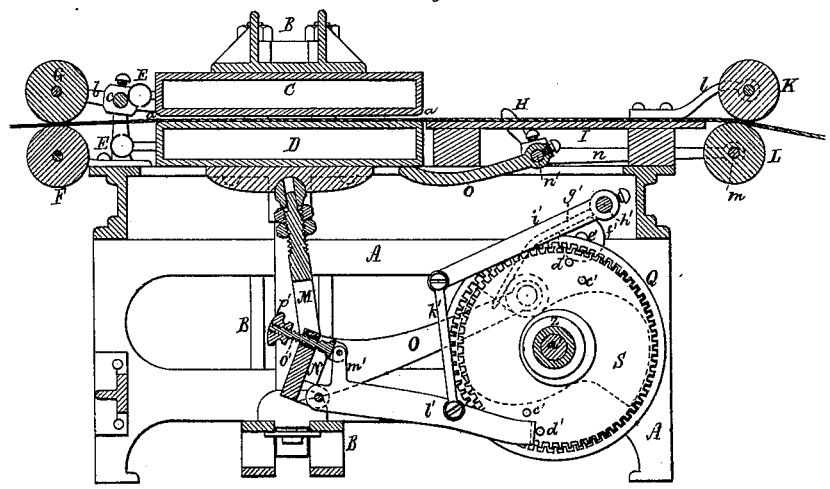
Figure 3:
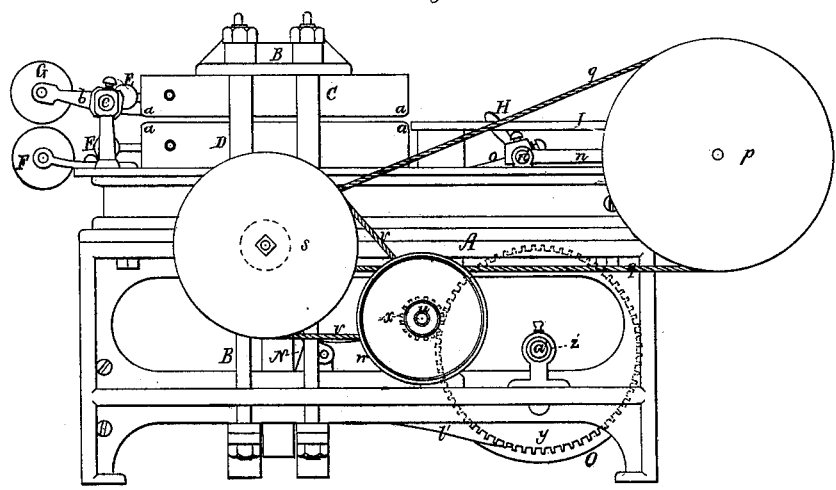
Figure 5:
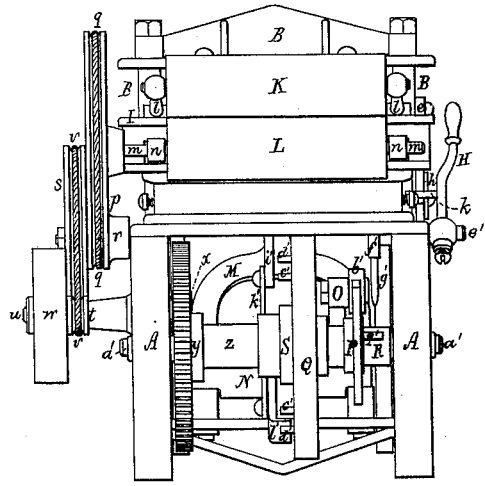

Figure 1 is a top view; Figs. 2 and 3, opposite side elevations, and Fig. 4 a longitudinal section; and Fig. 5 is a front-end view of our cloth-finishing machine.

In this machine there is a press having flat pressing-surfaces to its bed and platen, and either the bed or platen, or both of them, chambered to receive steam or other suitable means of heating the same. There is also mechanism for steaming the cloth, or discharging upon it steam in numerous jets, preparatory to its being drawn between, and subjected to the pressure and heat of, the bed and platen. The platen is stationary; but the bed is movable vertically underneath the platen, and is provided with mechanism for operating it.

After the cloth may have been pressed and heated a sufficient period of time by the bed and platen, the bed drops down, and mechanism is put in operation to effect a forward movement of the cloth, so as to remove from between the bed and platen the part finished, and draw another portion between them to be finished, or steamed, heated, and pressed. While the cloth is in the act of being advanced, the bed is at rest. Furthermore, there is to the machine a "stop-motion," or mechanism which, in case of the cloth becoming improperly wrinkled or folded, will arrest the operation of the feeding or draft rollers, and thus stop the delivery or advance of the cloth, until such time as the fold or the cause of the stoppage may be removed.

In machines heretofore constructed for finishing cloth, a bed and platen and delivery-rollers have been used, though unprovided with means or devices for steaming or dampening the cloth preparatory to its being pressed, or with a stop-motion or mechanism for arresting the delivery of the cloth, under circumstances as before stated.

In the drawings, A denotes the frame for supporting the main operative parts. Within and fastened to this frame is an upright and transverse press-frame, B, which supports the platen C, immediately underneath which is the bed D. The said bed, as well as the said platen, is represented as chambered to receive steam. In some cases it will be necessary to chamber but one of them, though, generally speaking, it is better to have both chambered. At their ends the pressing-surfaces of the bed and platen are beveled or chamfered, as shown at $a\ a\ a\ a$, in order to prevent the cloth from being creased by such ends. In rear of the bed and platen are the steamers or perforated vessels E E, for discharging steam on the upper and lower surfaces of the piece of cloth. They are supported by, and communicate by pipes with, the bed and platen. In rear of the said steamers is a guide-roller, F, whose journals rest in stationary bearings. Over and upon the roller F is a roller, G, whose journals are supported in arms $b\ b$, extending from a rock-shaft, $c$, provided with another arm, $d$, arranged as shown. The said arm $d$ is pivoted to a rod, $e$, arranged to move vertically in the frame A, and furnished with a stud, $f$, to enter the notch $g$ of a horizontal slide, $h$, arranged as represented. A spring, $i$, suitably applied to the slide $h$, and to the frame A, serves to impel forward the said slide on depression of the rod $e$ sufficiently to force its stud out of the notch of the slide $h$. The said slide $h$, at its front end, bears against a pin, $k$, projecting inward from a shipper, H, to be hereinafter described.

In advance of the platen and bed is a table or platform, I, provided at its front end with a draw-roller, K, whose journals are supported in arms $l\ l$, extending from the platform. Under the said roller K is another roller, L, whose shaft $m$ is supported by arms $n\ n$, projecting from a rock-shaft, $n'$, arranged as shown, and provided with an arm, $o$, extended back from its middle and directly underneath the bed D. On the bed being depressed, it will force down the said arm $o$, and thereby cause the draft-roller L to be pressed upward against the cloth which passes between it and the roller K. The roller L, being in revolution while so forced up to the cloth, will cause it to advance or be drawn forward.

The mechanism for revolving the roller L may be thus described: It consists of a grooved wheel, $p$, fixed on the shaft of such roller, an endless band, $q$, going around such wheel, and a pulley, $r$, fixed to the side of a larger pulley, $s$, about which and a grooved pulley, $t$, fixed on the driving-shaft $u$ of the machine, is another endless band, $v$, all being arranged as represented. The said shaft carries a driving-pulley, $w$, and a spur-pinion, $x$. This latter (shown in dotted lines in Fig. 2) engages with a large spur-gear, $y$, fixed on another or tubular shaft, $z$, which is supported by, and is concentric with, a stationary shaft, $a'$, extended across the frame A.

The platen is operated by two toggles, M N, arranged underneath it. The lower of such toggles pivots upon the lower bar of the frame B, and is provided with an arm, O, extended from it, in manner as shown, and furnished with a friction-roller, $b'$, to bear against the edge of a duplex cam, P. This cam, with an internal gear, Q, is fixed on a tubular shaft, R, that is supported by, and turns on, the shaft $a'$.

Arranged within the said internal gear Q is a spur-gear, S. The gear Q has one more tooth than the gear S. The pitches of the teeth of both gears are alike in size, but the pitch-circles of such gears differ in diameter, the difference being a little greater than the length of a tooth of either gear. The gear S turns on an eccentric, T, fixed on the shaft $z$ of the spur-gear $y$.

Figure 6:
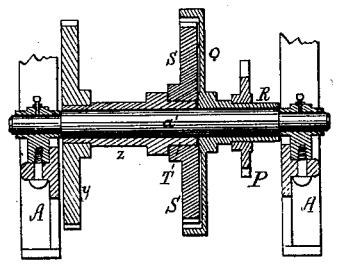
Figure 7:
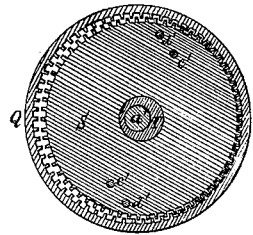

Fig. 6 is a longitudinal section taken through the axis of the shaft $a'$, showing the mechanism thereon. Fig. 7 is a transverse section taken through such shaft and the eccentric T, and the gear-wheel encompassing such eccentric.

Figure 8:
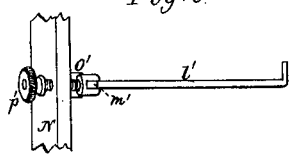

Two sets of studs, $c'$ $d'$, extend inward from the gear S, those marked $d'$ being farther from the center of the wheel than are those marked $c'$. On the shaft $e'$ of the shipper H is a cam, $f'$, upon whose periphery rests an arm, $g'$, projecting from a rock-shaft, $h'$. From the middle of such rock-shaft $h'$ an arm, $i'$, extends backward, and by a link, $k'$, is connected to another arm, $l'$, (see Fig. 8, which is a top view of the arm $l'$,) arranged as shown, and pivoted to the lower part of the lower toggle of the press.

To a projection or ear, $m'$, extending up from the arm $l'$, a screw, $o'$, is hinged. This screw goes through a hole in the upper part of the lower toggle, and is provided with a nut, $p'$, all being arranged as represented.

From the side of the double cam P two pins, $q'$ $q'$, are projected, as shown. The arm $l'$, near its outer end, is bent at a right angle toward the gear S.

The spur-gear $y$ of the shaft $z$, on being put in continuous revolution, will cause its shaft $z$ to revolve the eccentric T within the hub of the gear S, which will produce such a movement of such gear S within the gear Q as to effect a gradual rotary movement of the said gear S until one of its pins may bring up against the end of the arm $l'$. On this taking place the gear S, though in movement, will cease revolving, but will revolve the gear Q, thereby causing the cam P to be revolved against the roller $b'$ of the arm O. On the arm O being elevated by the cam P, the toggles will be actuated so as to press the platen upward. After the platen may have been moved up, so as to compress the cloth between it and the bed, the cam will continue to revolve for a while without producing any movement of the toggle-arm, but it will next carry one of the pins $q'$ against the arm $g'$ in a manner to move such and cause the arm $l'$ to be raised above that pin $d'$ of the gear S which may have been abutting against it, whereby the gear S will be estopped from revolving the gear Q. The gear S, however, will next be revolved until the pin $c'$ next in rear to the pin $d'$, above which the arm $l'$ was raised, may meet the end of the said arm. On such taking place the gear Q will be again put in revolution, and will again move the cam P under the roll of the arm O. On the roll passing the extreme part of the cam, such roll will drop and allow the platen to fall away from the bed. The bed, on descending, will cause the lower of the draft-rollers to be forced upward, so as to pinch the cloth between it and the roller over it, whereby the cloth will be drawn forward until another portion of it may have been steamed and drawn between the platen and bed. On the pin $q'$ being carried by the arm $g'$, the arm $l'$ would drop down were it not held up by the lever-toggle and the screw $o'$ and nut $p'$. Such arm, however, falls with the said toggle during its next descent, so as to be ready for again performing its duty.

Should the cloth in its passage into the bite of the rollers F G be folded, or have upon it any extraneous matter, whereby, in going into the said bite, it would press upward the upper of such rollers sufficiently to cause the stud $f$ to pass out of the notch $g$, the slide $h$ will be forced against the pin $k$ of the shipper, and move the latter, so as to cause the cam $f'$ to force upward the arm $g'$, and thus cause the arm $l'$ to be raised out of action with the studs of the gear S, thereby insuring stoppage of the press until the defect in the cloth may be removed.

From the above it will be seen that the cloth, after having been dampened by the steam, is subjected to pressure between heated plane or parallel surfaces, and after having remained between them a while the pressure of them is removed from it, and it is drawn forward a suitable distance to bring another or succeeding portion of it between such surfaces, to be submitted to their action.

This mode or process of finishing cloth produces much better results than are effected by running the cloth between and around or over a heated cylinder or a set of heated cylinders.

What we claim as our invention may be stated as follows:

1. The combination of cloth steaming or dampening mechanism, a press having flat or plane pressing-surfaces, and provided with means of heating its platen and bed, or either, and mechanism for automatically advancing the cloth relatively to such press and dampening mechanism, all being to operate essentially as specified.

2. The combination of the stop-motion, substantially as described, with the press and its mechanism, as specified, for automatically advancing the cloth relatively to such press, all being to operate essentially as set forth.

3. The combination of the stop-motion, substantially as described, with the press, the mechanism for dampening the cloth, and the mechanism, as specified, for advancing it relatively to the press and the dampening mechanism, all being to operate essentially as set forth.

4. The combination of the eccentric T, the gear S, with its sets of pins $c'$ $d'$, the internal gear Q, the duplex cam P, with its pins, the arms O, $l'$, and $g'$, arranged, constructed, and applied substantially in manner and to operate as specified.

WILLIAM H. LEACH.
ARNOLD S. ALLEN.

In presence of—
S. BERRY,
BENN AINSWORTH.